United States Patent [19]

Pullar et al.

[11] Patent Number: 5,533,333
[45] Date of Patent: Jul. 9, 1996

[54] METHOD AND REGULATOR FOR REGULATING THE AIR PRESSURE OF A PRESSURIZED VESSEL

[75] Inventors: Gregory T. Pullar, Bellingham; Robin B. Christensen, Ferndale; Lester J. Okonek, Bellingham, all of Wash.

[73] Assignee: Atlantic Richfield Company, Los Angeles, Calif.

[21] Appl. No.: 236,597

[22] Filed: Apr. 29, 1994

[51] Int. Cl.$^6$ ............................ F16D 31/00; F16D 31/02; F15B 11/08
[52] U.S. Cl. ...................... 60/327; 60/453; 60/456; 60/459; 91/446; 91/448
[58] Field of Search ............................ 60/453, 413, 456, 60/459, 468, 494, 327, 407; 91/445, 446, 448, 459

[56] References Cited

U.S. PATENT DOCUMENTS

| 2,961,829 | 11/1960 | Weisenbach | 60/456 X |
|---|---|---|---|
| 3,429,123 | 2/1969 | Burroughs | 60/453 X |
| 4,537,029 | 8/1985 | Gunda et al. | 60/429 X |
| 4,892,569 | 1/1990 | Kojima | 55/163 |
| 5,048,295 | 9/1991 | Hoscheler | 60/459 X |
| 5,355,939 | 10/1994 | Aoki | 60/453 X |

FOREIGN PATENT DOCUMENTS

| 4119333 | 12/1992 | Germany | 60/468 |
|---|---|---|---|
| 2113310 | 8/1983 | United Kingdom | 91/459 |

Primary Examiner—Hoang Nguyen
Attorney, Agent, or Firm—Tom F. Pruitt

[57] ABSTRACT

A regulator for controlling the air pressure of compressed air in an air reservoir which serves as a source of motive compressed air for an air driven device is provided. A method is provided for maintaining sufficient operating pressure of a pressurized air supply tank utilized in air driven systems such as a vehicle braking system.

18 Claims, 1 Drawing Sheet

METHOD AND REGULATOR FOR REGULATING THE AIR PRESSURE OF A PRESSURIZED VESSEL

BACKGROUND OF THE INVENTION

1. Field of the Invention

In one aspect, this invention relates to a method to control the air pressure of an air reservoir which serves as a source of motive compressed air for an air driven device. In another aspect, this invention relates to a method of maintaining sufficient operating pressure of a pressurized air supply tank utilized in an air driven system such as a vehicle braking system. In still another aspect, this invention relates to a regulator for regulating the pressure of a pressurized vessel.

2. Prior Art

Pressurized air tanks are commonly employed in air braking systems used with heavy duty service vehicles such as trucks, trailers, trains, trackmobiles and other heavy equipment. The air tank provides a reservoir of motive air to drive the brake system and also avoids the need for simultaneous generation of motive air at the time braking is needed.

The air pressure vessel also provides an excess supply of air to overcome air losses resulting from line and other system leaks. Air leaks can be a serious problem and it is common in the train and trackmobile air brake art to dump all air which results in an emergency vehicle stop when air pressure drops below a predetermined safe operating pressure. That is, the motive air drives the air brakes to a non-braking "open" position and maintains them in a non-braking position. When low air pressure is detected, the air is dumped from the pressure vessel, the brakes engage and the vehicle is brought to a stop. This is a long standing safe operating practice.

For example, with train and trackmobile air systems, a low air pressure indication will result in an air dump, brake engagement and inactivation of remote vehicle control systems which are used to direct the vehicle from a distance. Since the pressure vessel is relatively small, it does not take much air leakage to cause a work stoppage. The air compressors generally used with trains and trackmobiles are driven off the flywheel or crankshaft of the vehicle motor and thus the air generation output is dependent upon the vehicle engine speed. At time of air loss and vehicle brake stoppage, the vehicle engine speed is generally reduced. At reduced engine speeds, air compressor drive speed is relatively slow and thus air compression and tank filling is a slow process. In some instances, we have found that repressurization of the air reservoir could take from about ten to fifteen minutes or more. This results in a significant loss of work time and vehicle utilization.

To avoid vehicle downtime and work delays, we have tried several different approaches to solve the problems associated with the air losses and automated vehicle braking. First, we tried using a remote air source. We connected, via flexible hose, high pressure air from a stationary external compressor and stationary second pressure vessel. Although our vehicle had a relatively limited travel zone along a short segment of track, we found stationary air supplies and hose connections were not practical because of the restrictions imposed on vehicle movement. We experimented also with large volume output rotary screw compressors as a substitute for gear-type compressors and found no operating improvement where the compressors were driven by the crankshaft or other drive source when the power output of which was dependent on engine speed.

Because of the lost vehicle-utilization time caused by air brake system shutdown, there is a need for improved methods of controlling pressure of pressurized tanks utilized in air driven vehicle braking systems and for improved air tank pressure regulators.

SUMMARY OF THE INVENTION

We have discovered an improved, effective method for controlling pressure of pressurized air tanks. This method is particularly useful in controlling the supply air pressure for an air brake system. We have found that we can utilize the vehicle hydraulic drive transmission to drive a hydraulic oil pump and, by use of a novel oil flow and pressure control loop, we can direct and vary the oil output from the hydraulic oil pump to drive an oil motor, and in turn drive an air compressor at predetermined speeds. This air pressure supply and pressure regulation method is useful as it provides a hydraulic air compressor drive having nearly full output at engine idle. Thus, regardless of engine speed, air braking and other air driven loops such as air driven remote vehicle controllers will have sufficient motive air for satisfactory and continuous operation. We have found that it is advantageous to have a first control valve to first preset a maximum available oil flow from an oil pump to an oil driven motor and to use such valve to vary, depending on compressed air demand and oil loop operations, such maximum available oil flow and then to have a second control valve which regulates and provides trim control of the oil pressure to the oil driven motor and can control the oil discharge pressure downstream of the oil driven motor. By thus controlling the oil pressure environment of the oil driven motor, the motor, and thus the air compressor which the shaft of the motor drives, can be operated at a desired speed, or preferably a constant speed, within a variety of possible oil flow rates.

In accordance with one embodiment of this invention, a method of controlling the air pressure of compressed air in an air reservoir which serves as a source of motive compressed air for an air driven device is provided wherein a preferred method comprises (a) supplying oil from an oil reservoir to an oil pump; (b) driving the oil pump by a prime mover such as an engine or electric motor to produce pump discharge pressurized oil; (c) applying the pump discharge pressurized oil to drive an oil driven motor comprising an output power shaft; (d) returning spent oil from the oil driven motor to the oil reservoir by use of a spent oil return line; (e) controlling and varying the rate of flow of the pump discharge pressurized oil to the oil driven motor by use of a flow controller; (f) controlling the pressure of the pressurized oil of the pump discharge at varying rates of flow of the pressurized oil to the oil driven motor by use of a pressure controller to drive the oil driven motor at desired speed levels; and (g) driving an air compressor by the output power shaft of the oil driven motor to provide compressor effluent compressed air to the air reservoir. Preferably, a portion of the pressurized oil of the pump discharge, being the excess amount of oil over that needed to drive the oil driven motor, is directed to the oil reservoir as excess pump discharge return by use of a relief valve which is set to a predetermined relief pressure, preferably determined by the capacity of the oil pump, load demand of the oil motor and associated air compressor and experimentation with the oil flow loop. In one variation of this embodiment, the oil pump is a hydraulic pump driven by a torque converter which is powered by the prime mover. In variations where the oil motor is physically located above the oil pump, gravity drainage of oil back to the oil pump can occur leaving the oil motor bearings relatively dry and unlubricated. Preferably, a check valve is employed in the oil supply line to the oil motor and provides the added method step of preventing flow of oil from the oil driven motor toward the oil pump. In still more preferred variations, the oil pressure in the oil return line from the oil motor to the oil reservoir is controlled by sensing the oil pressure from the oil driven motor and adjusting the rate of flow of oil to the oil driven motor. Preferably, clean air is withdrawn into the compressor by being taken downstream of the prime mover or engine air intake manifold cleaner to avoid the need for a separate air filter. More preferably, the effluent from the air compressor is dried by an air dryer before being directed to the air tank. We have found that the spent oil in the oil return line which is discharged from the oil driven motor is preferably cooled before being returned to the oil reservoir; otherwise, heat added by the pump and the motor can build up to a level that the oil can degrade. It is also preferable to filter the oil in the oil return line from the oil driven motor before the oil is returned to the oil reservoir.

In another embodiment of this invention, a regulator is provided which controls the air pressure of an air reservoir that serves as a source of motive compressed air for an air driven device, such as a vehicle air brake. In one variation, a preferred regulator comprises (a) an oil reservoir containing oil and comprising an oil outlet line; (b) an oil driven motor comprising an output power shaft and a motor oil feed line; (c) an oil return line from the oil driven motor to the oil reservoir; (d) an oil pump having as pump suction, oil from the oil outlet line of the oil reservoir and having as pump discharge pressurized oil to the motor oil feed line, wherein the oil pump is preferably a hydraulic pump driven by a torque converter which in turn is driven by a prime mover; (e) a flow controller positioned in the motor oil feed line and adapted to vary and control the rate of flow of the pump discharge pressurized oil to the oil driven motor, wherein the flow controller is preferably an adjustable valve; (f) a pressure controller positioned in the motor oil feed line and adapted to control the pressure of the pressurized oil of the pump discharge at varying rates of flow of the pressurized oil to the oil motor, wherein the pressure controller is preferably an adjustable valve; (g) a check valve positioned in the motor oil feed line and adapted to prevent reverse flow of oil from the oil driven motor toward the oil pump; and, (h) an air compressor which is driven by the output power shaft of the oil driven motor and which provides effluent compressed air to the air reservoir. Preferably, the regulator comprises a relief valve, which is positioned between the oil pump and the flow controller, to direct a portion of the pressurized oil of the pump discharge to the oil reservoir as excess pump discharge return. In one preferred variation of this embodiment, a pressure sensor is located in the oil return line from the oil driven motor and is operably connected to the pressure controller for control of oil pressure in the oil return line. Since the air to be compressed can contain moisture, preferred regulators incorporate an air dryer effluent from the air compressor before the air reservoir. In preferred variations, an oil cooler is positioned in the oil return line from the oil driven motor. An oil filter is preferably positioned in the oil return line from the oil driven motor.

DESCRIPTION OF A PREFERRED EMBODIMENT

Figure 1:
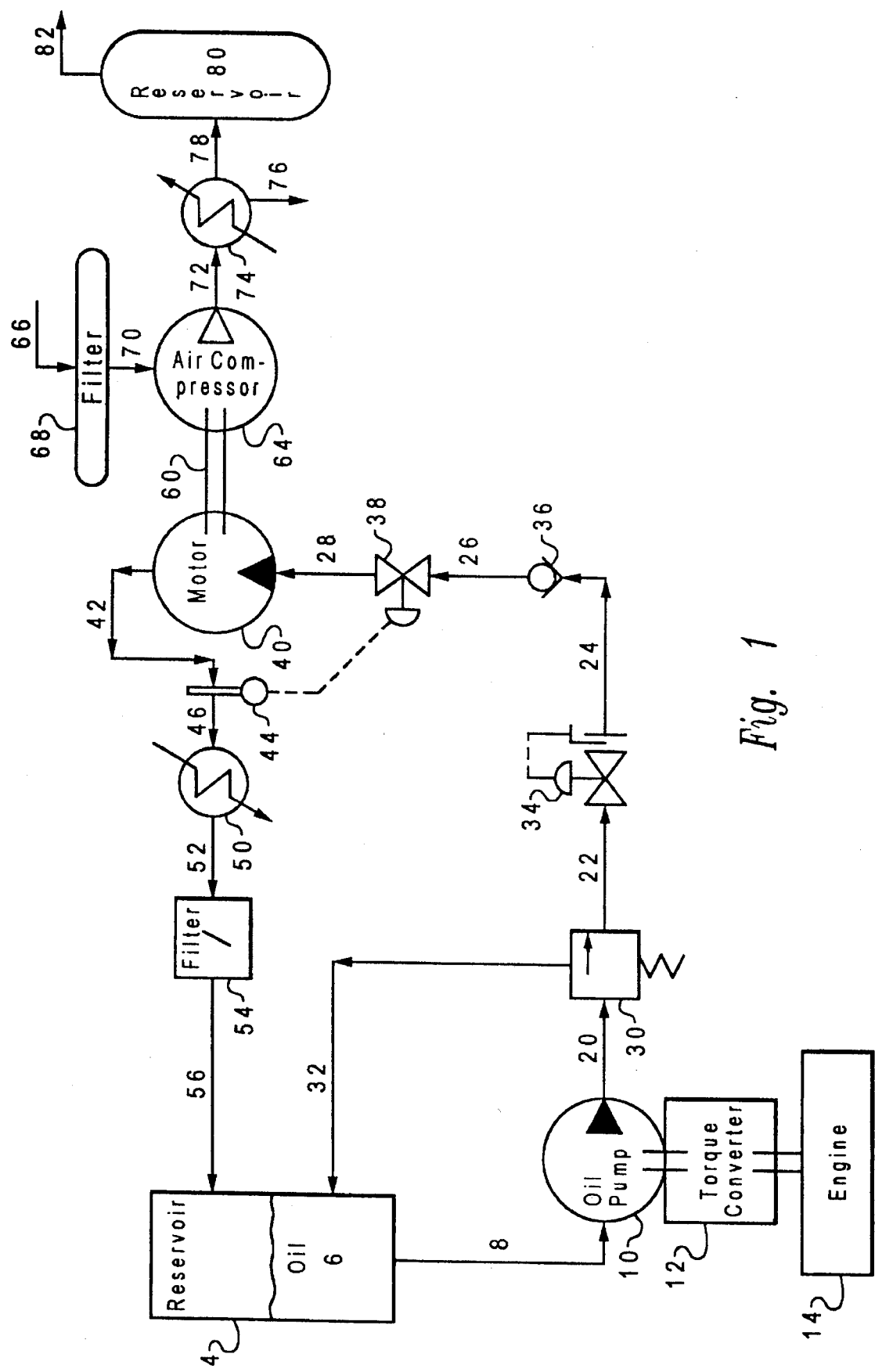
FIG. 1 is a schematic representation of one embodiment of a regulator provided in accordance with this invention to control the air pressure of an air reservoir.

In FIG. 1, one embodiment of a regulator of this invention is shown. An oil reservoir 4 contains a supply of oil 6 and has an oil outlet line 8 connected to the pump suction of an oil pump 10. The oil pump 10 is preferably driven by a torque converter 12 which in turn is driven by a Vehicle engine prime mover 14. The oil pump 10 pump discharge is pressurized oil 20 which is passed through various motor feed line conduits 22, 24, 26, and 28 and is used to drive motor 40. Relief valve 30 is positioned between the oil pump 10 and an adjustable valve 34. The valve 34 is a flow controller for controlling and varying the rate of flow of the pump discharge pressurized oil to the motor 40 and is preferably positioned in the motor 40 oil feed conduits 22 and 24. The relief valve 30 is positioned downstream of the pump 10 in the pump 10 discharge line 20 and is used to direct a portion of the pressurized oil discharge 20 from the pump 10 to the oil reservoir 4 as excess pump discharge return via conduit 32. Flow controller 34 is adjusted to control the rate of flow of the pump 10 discharge pressurized oil 20 to the oil driven motor 40. In this variation, a check valve 36 is positioned between motor 40 oil feed conduits 24 and 26 and is preferably adapted to prevent reverse flow of oil from the oil driven motor 40 toward the oil pump 10. An oil cooler 50 is positioned downstream of the pressure sensor 44 and oil passing from the motor 40 via conduits 42 and 46 is cooled to reduce heat build up and associated foaming and degradation. Discharge 52 from the cooler 50 is passed through an oil filter to remove any particulate matter that may have entered the system. Filtered oil 56 is returned to the oil reservoir 4. A pressure controller 38 is positioned in the motor 40 oil feed conduit 26 and 28 and a pressure sensor 44 is located in the oil return line 42 from the oil driven motor 10. The pressure sensor 44 indicates pump 10 discharge pressure in conduit 42 and preferably the pressure controller 38 controls the pressure of the pressurized oil in conduit 28 to the motor 40. The oil driven motor 40 comprises an output power shaft 60 which drives an air compressor 64. Intake air 66 to the compressor 64 is preferably passed through a filter 68 and through filtered air conduit compressor feed manifold 70. It is understood that the filter 68 may comprise an engine air cleaner. Effluent compressed air 72 is preferably passed in contact with a commercially available catalytic air dryer 74 to remove excess moisture 76 to avoid icing and then is directed via conduit 78 to the air reservoir 80. From reservoir 80, compressed motive air 82 is directed to applicable service, via various valving and conduits (not shown) such as an air braking system.

Variations in the foregoing invention can be made without departing from the spirit and scope thereof.

What is claimed is:

1. A method of controlling the air pressure of compressed air in an air reservoir which serves as a source of motive compressed air for an air driven device, said method comprising:

supplying oil from an oil reservoir to an oil pump;

driving said oil pump by a prime mover to produce pump discharge pressurized oil;

applying said pump discharge pressurized oil to drive an oil driven motor comprising an output power shaft;

returning spent oil from said oil driven motor to said oil reservoir by use of a spent oil return line;

controlling and varying the rate of flow of said pump discharge pressurized oil to said oil driven motor by use of a flow controller;

sensing the pressure of said oil discharged into said oil return line from said oil driven motor;

based on said sensed pressure of said discharged oil, controlling the pressure of said pressurized oil of said pump discharge at varying rates of flow of said pressurized oil to said oil driven motor by use of a pressure controller to drive said oil driven motor at desired speed levels; and, driving an air compressor by said output power shaft of said oil driven motor to provide compressor effluent compressed air to said air reservoir.

2. A method in accordance with claim 1 wherein said oil pump is a hydraulic pump driven by a torque converter which is powered by said prime mover.

3. A method in accordance with claim 1 comprising the step of preventing flow of oil from said oil driven motor toward said oil pump by use of a check valve.

4. A method in accordance with claim 1 wherein a portion of said pressurized oil of said pump discharge is directed to said oil reservoir as excess pump discharge return by use of a relief valve.

5. A method in accordance with claim 1 wherein said effluent from said air compressor is dried by an air dryer.

6. A method in accordance with claim 1 wherein said spent oil in said oil return line from said oil driven motor is cooled before being returned to said oil reservoir.

7. A method in accordance with claim 1 wherein said spent oil in said oil return line from said oil driven motor is filtered before being returned to said oil reservoir.

8. A regulator to control the air pressure of an air reservoir which serves as a source of motive compressed air for an air driven device, said regulator comprising:

an oil reservoir containing oil and comprising an oil outlet line;

an oil driven motor comprising an output power shaft and comprising a motor oil feed line;

an oil return line from said oil driven motor to said oil reservoir;

an oil pump having, as pump suction, oil from said oil outlet line of said oil reservoir, and having, as pump discharge, pressurized oil to said motor oil feed line;

a flow controller positioned in said motor oil feed line and adapted to vary and control the rate of flow of said pump discharge pressurized oil to said oil driven motor;

a pressure sensor located in said oil return line from said oil driven motor;

a pressure controller positioned in said motor oil feed line, said pressure controller being operably connected to said pressure sensor and, based on said pressure sensed by said pressure sensor, adapted to control the pressure of said pressurized oil of said pump discharge at varying rates of flow of said pressurized oil to said oil driven motor;

a check valve positioned in said motor oil feed line and adapted to prevent reverse flow of oil from said oil driven motor toward said oil pump; and, an air compressor which is driven by said output power shaft of said oil driven motor and which provides effluent compressed air to said air reservoir.

9. A regulator in accordance with claim 8 wherein a relief valve is positioned between said oil pump and said flow controller to direct a portion of said pressurized oil of said pump discharge to said oil reservoir as excess pump discharge return.

10. A regulator in accordance with claim 8 wherein said oil pump is a hydraulic pump driven by a torque converter which in turn is driven by a prime mover.

11. A regulator in accordance with claim 8 wherein said flow controller is an adjustable valve.

12. A regulator in accordance with claim 8 wherein said pressure controller is an adjustable valve.

13. A regulator in accordance with claim 8 wherein an air dryer is located in said effluent from said air compressor before said air reservoir.

14. A regulator in accordance with claim 8 wherein an oil cooler is positioned in said oil return line from said oil driven motor.

15. A regulator in accordance with claim 8 wherein an oil filter is positioned in said oil return line from said oil driven motor.

16. A regulator in accordance with claim 8 wherein said air driven device is an air brake.

17. A regulator to control the air pressure of an air reservoir which serves as a source of motive compressed air for an air driven device, said regulator comprising:

a. an oil reservoir containing oil and comprising an oil outlet line;

b. an oil driven motor comprising an output power shaft and comprising a motor oil feed line;

c. an oil return line from said oil driven motor to said oil reservoir;

d. an oil pump driven by a torque converter which in turn is driven by a prime mover, said oil pump having as pump suction oil from said oil outlet line of said oil reservoir and having as pump discharge pressurized oil to said motor oil feed line;

e. an adjustable valve flow controller positioned in said motor oil feed line to control the rate of flow of said pump discharge pressurized oil to said oil driven motor;

f. a relief valve is positioned between said oil pump and said adjustable valve flow controller to direct a portion of said pressurized oil of said pump discharge to said oil reservoir as excess pump discharge return;

g. a pressure controller positioned in said motor oil feed line and a pressure sensor located in said oil return line from said oil driven motor which is operably connected to said pressure controller for control of oil pressure in said oil return line at varying rates of flow of said pressurized oil to said oil driven motor;

h. an oil cooler positioned in said oil return line from said oil driven motor;

i. an oil filter located in the discharge line from said oil driven motor;

j. a check valve positioned in said motor oil feed line and adapted to prevent reverse flow of oil from said oil driven motor toward said oil pump;

k. an air compressor which is driven by said output power shaft of said oil driven motor and which provides effluent compressed air; and, l. an air dryer which contacts said effluent compressed air from said air compressor before said effluent compressed air is directed to said air reservoir.

18. A regulator in accordance with claim 17 wherein said air driven device is an air brake.

* * * * *